(12) United States Patent
Ishida

(10) Patent No.: US 12,169,549 B2
(45) Date of Patent: Dec. 17, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tomoya Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 17/816,310

(22) Filed: Jul. 29, 2022

(65) Prior Publication Data

US 2023/0030460 A1 Feb. 2, 2023

(30) Foreign Application Priority Data

Aug. 2, 2021 (JP) ................................. 2021-126780

(51) Int. Cl.
*G06F 21/44* (2013.01)
*G06F 21/31* (2013.01)

(52) U.S. Cl.
CPC ............ *G06F 21/445* (2013.01); *G06F 21/31* (2013.01)

(58) Field of Classification Search
CPC ............................... G06F 21/445; G06F 21/31
See application file for complete search history.

(56) References Cited

U.S. PATENT DOCUMENTS

| | | | | |
|---|---|---|---|---|
| 2003/0163741 A1* | 8/2003 | Mullins | .................. | G06F 21/31 726/30 |
| 2007/0226782 A1* | 9/2007 | Sato | .................. | H04W 12/0431 726/4 |
| 2007/0300308 A1* | 12/2007 | Mishura | .................. | G06F 21/78 726/27 |
| 2009/0190162 A1* | 7/2009 | Kohama | ............... | G06F 3/1259 358/1.15 |
| 2011/0162036 A1* | 6/2011 | Heo | ......................... | G06F 21/31 726/1 |
| 2011/0321144 A1* | 12/2011 | Saxena | .................... | G06F 21/34 726/6 |
| 2013/0347097 A1* | 12/2013 | Pan | .......................... | G06F 21/31 726/17 |
| 2015/0163214 A1* | 6/2015 | Sakai | ....................... | G06F 21/31 726/6 |
| 2015/0302621 A1* | 10/2015 | Liu | .......................... | G06T 11/60 345/647 |
| 2016/0092242 A1* | 3/2016 | Krishnamoorthy | ... | G06F 9/4401 713/2 |
| 2018/0067755 A1* | 3/2018 | Rhee | ....................... | G06F 21/629 |
| 2018/0074814 A1* | 3/2018 | Ganta | .................. | G06F 21/6218 |
| 2021/0352067 A1* | 11/2021 | Chen | ..................... | H04L 9/3247 |

FOREIGN PATENT DOCUMENTS

JP 2019183466 A 10/2019

* cited by examiner

*Primary Examiner* — Raqiul A Choudhury
(74) *Attorney, Agent, or Firm* — Canon U.S.A., Inc. IP Division

(57) ABSTRACT

An object is to lower the ratio of the number of users of an authentication service to the number of users of an application which uses the authentication service. A state of a first application is obtained by executing a second application. Whether to perform authentication processing is determined according to the state of the first application by executing the second application. Moreover, an instruction to perform the authentication processing is issued by executing the first application or the second application in a case where it is determined that the authentication processing is to be performed.

17 Claims, 11 Drawing Sheets

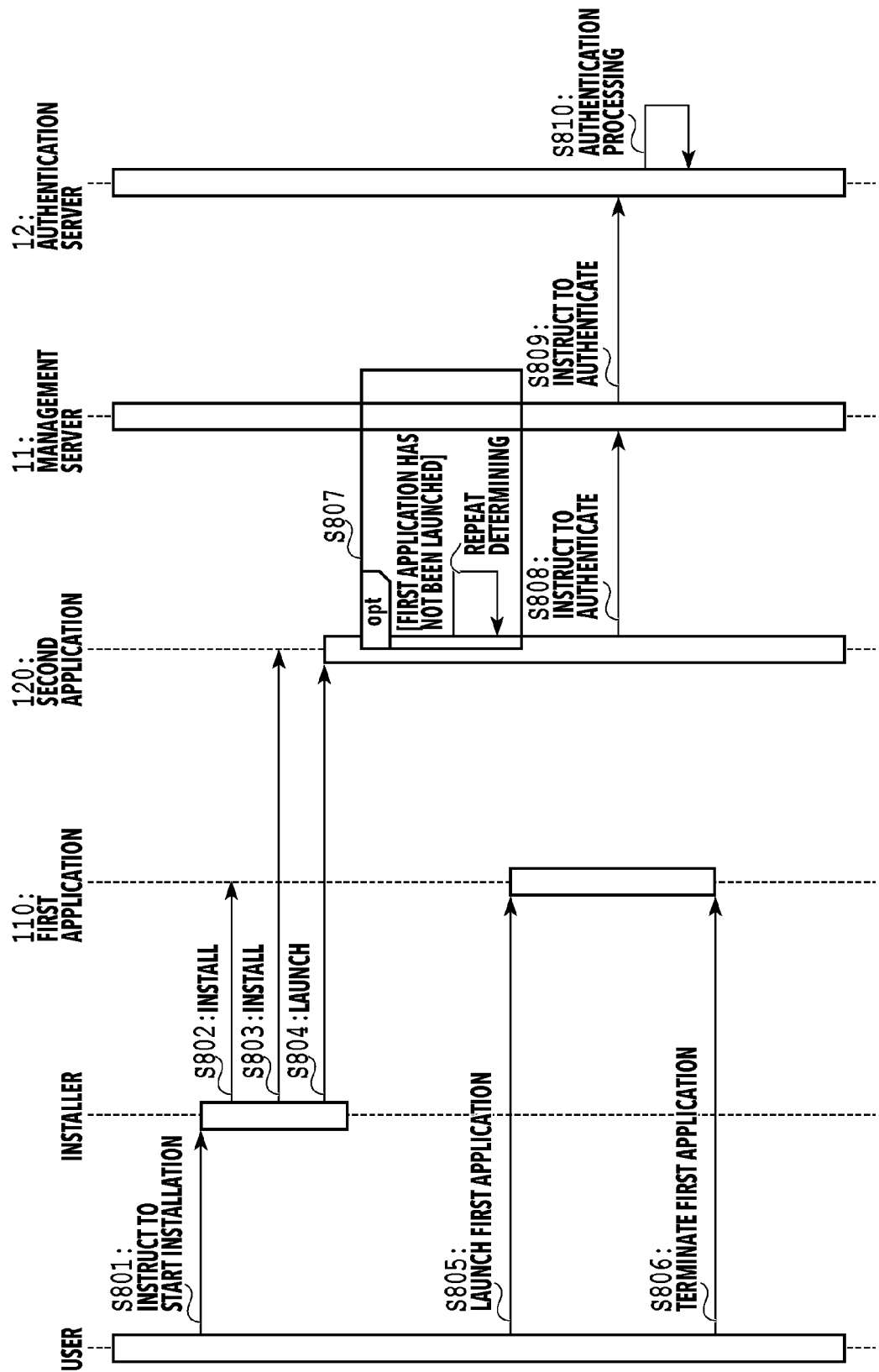

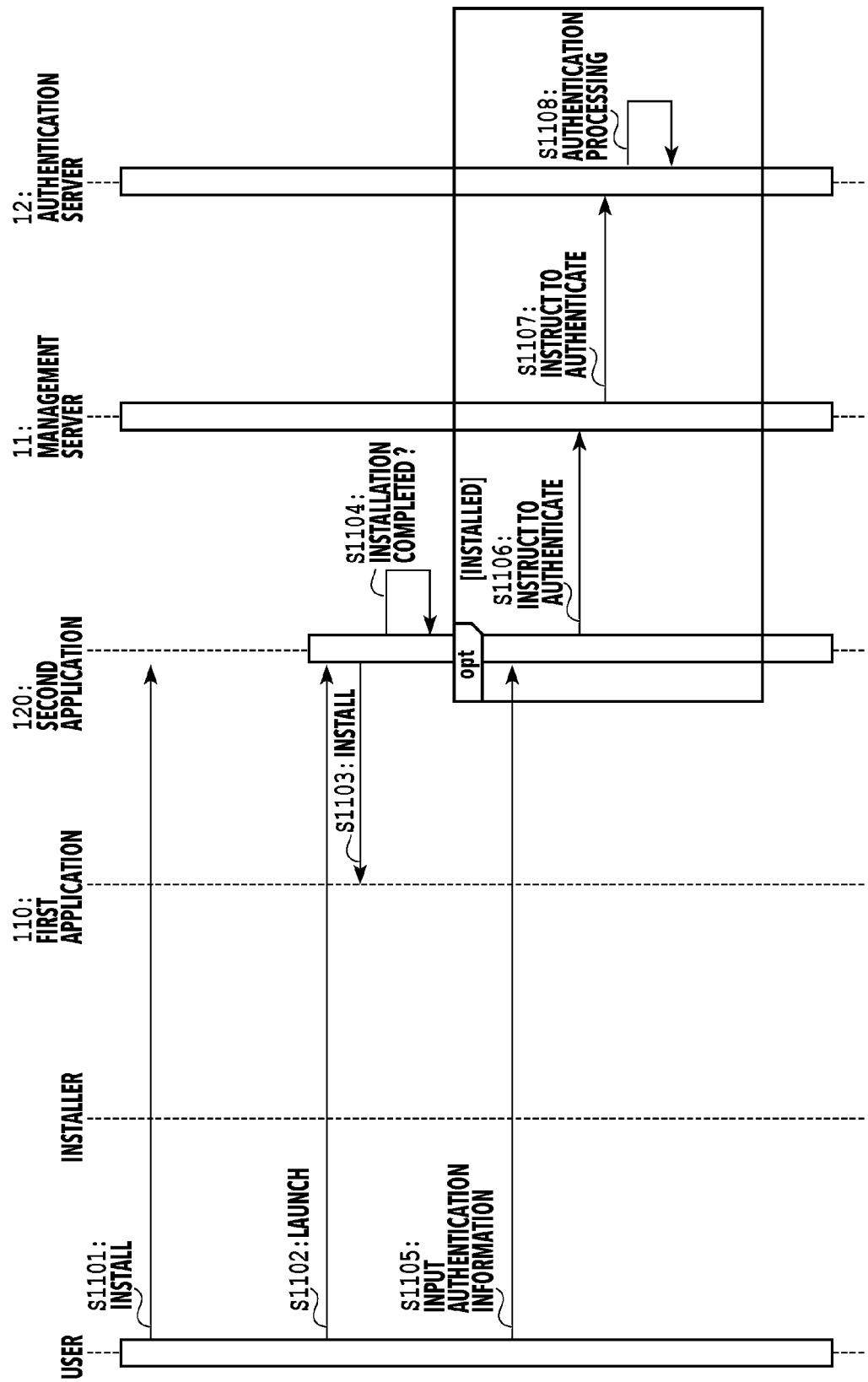

INFORMATION PROCESSING APPARATUS, INFORMATION PROCESSING METHOD, AND STORAGE MEDIUM

BACKGROUND

Field

The present disclosure relates to a technique for controlling timing of authentication processing.

Description of the Related Art

User authentication is performed in order to control an apparatus by receiving only operations from a particular user. Japanese Patent Laid-Open No. 2019-183466 discloses a technique for a parking garage control system by which an application operating on a user's mobile terminal is caused to output information prompting user authentication according to the positional relation between the parking garage and the mobile terminal. Also, there are systems including a client apparatus (hereinafter referred to simply as "client") and a server apparatus (hereinafter referred to simply as "server"). Such a system needs an authentication and authorization architecture using an application that operates in the client for communication between the client and the server. The authentication and authorization architecture is, for example, provided from a public cloud as a service that provides an authentication and authorization function (hereinafter referred to as "authentication service").

There has been a demand to lower the ratio of the number of users of an authentication service to the number of users of an application which uses the authentication service.

SUMMARY

An information processing apparatus according to the present disclosure is an information processing apparatus that executes a first application and a second application, comprising: one or more hardware processors; and one or more memories storing one or more programs configured to be executed by the one or more hardware processors, the one or more programs including instructions for: obtaining a state of the first application by executing the second application; determining whether to perform authentication processing according to the state of the first application by executing the second application; and issuing an instruction to perform the authentication processing by executing the first application or the second application in a case of determining that the authentication processing is to be performed.

Further features of the present disclosure will become apparent from the following description of exemplary embodiments with reference to the attached drawings.

BRIEF DESCRIPTION OF THE DRAWINGS

FIG. 8 is a sequence chart illustrating an example of the processing sequence of authentication processing according to one or more aspects of the present disclosure;

FIG. 11 is a sequence chart illustrating an example of the processing sequence of authentication processing according to one or more aspects of the present disclosure.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Embodiment 1

Figure 1:
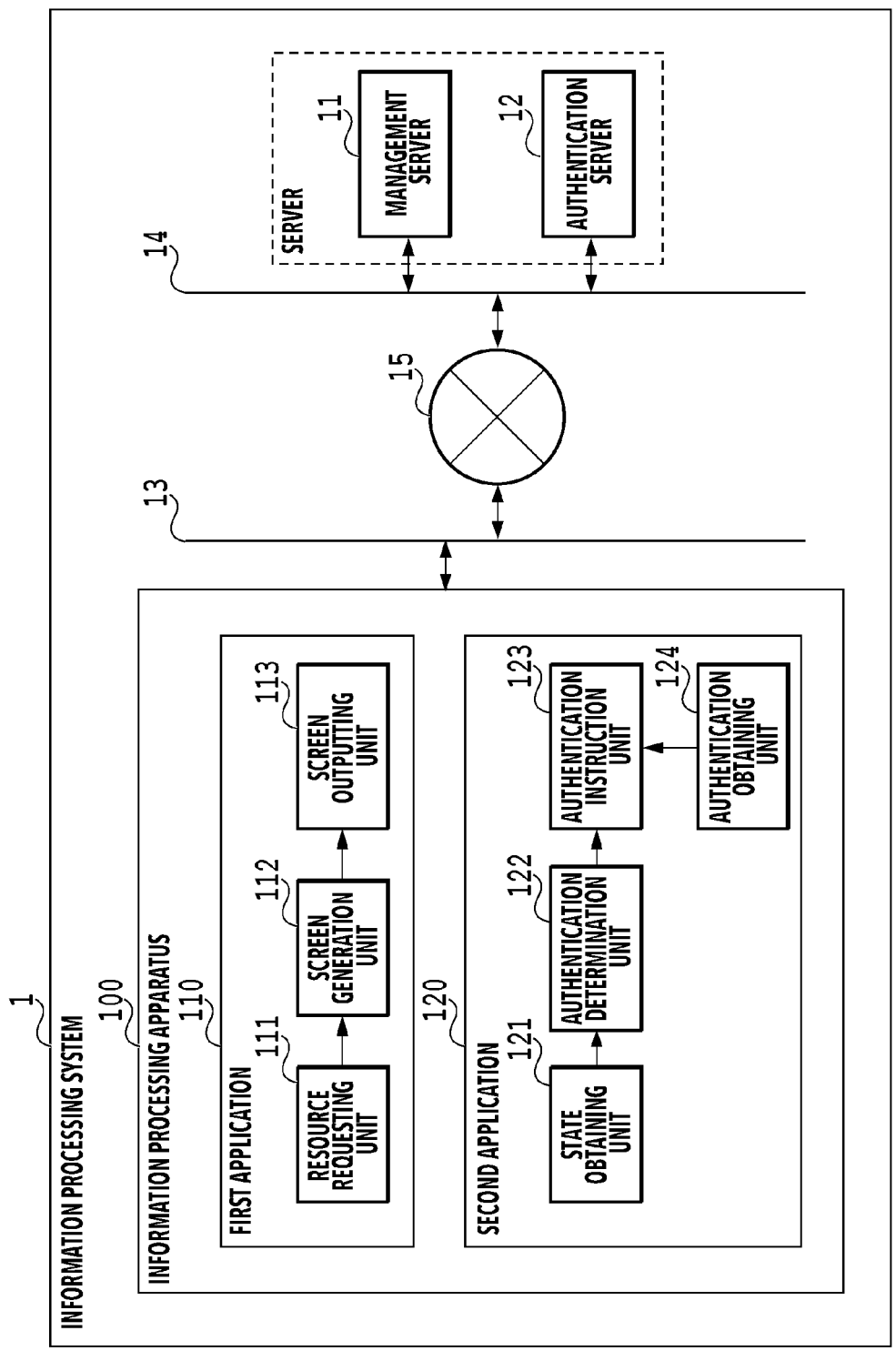
FIG. 1 is a block diagram illustrating an example of the configuration of an information processing system according to one or more aspects of the present disclosure.

An information processing system 1 according to Embodiment 1 will be described with reference to FIGS. 1 to 9E. FIG. 1 is a block diagram illustrating an example of the configuration of the information processing system 1 according to Embodiment 1. The information processing system 1 has a management server 11, an authentication server 12, and an information processing apparatus 100. In the following description, the management server 11 and the authentication server 12 will be collectively referred to simply as "the server" as well. In other words, "the server" herein refers to a server system including one or more servers. The server and the information processing apparatus 100 communicate with each other through their networks 13 and 14 and Internet 15. The management server 11 and the authentication server 12 communicate with each other through the network 14.

The management server 11 is an apparatus that operates as a back end for the information processing apparatus 100, and manages or controls resources providable to the information processing apparatus 100. Here, each resource managed or controlled by the management server 11 (hereinafter referred to as "managed resource") is data such as images or documents providable to the information processing apparatus 100 or an external apparatus not illustrated in FIG. 1 such as a printer having a printing function and the like. Note that this external apparatus is not limited to a printer and may be, for example, an image input apparatus such as a scanner or camera having an image reading function. The management server 11 receives information that is based on a user's input operation or the like from the information processing apparatus 100, and manages or controls a corresponding managed resource based on this information. A configuration of the management server 11 will be described later. The authentication server 12 is an apparatus that performs processing of authenticating a user (hereinafter referred to as "authentication processing") and processing of granting authority to access a managed resource to the user authenticated by the authentication processing (hereinafter "authorization processing"). A configuration of the authentication server 12 will be described later.

As illustrated in FIG. 1, the information processing apparatus 100 executes a first application 110 and a second application 120 to cause them to operate. The first application 110 has a function of, by being executed, outputting information for accessing a managed resource to the management server 11 based on a user's input operation. Specifically, the first application 110 has, for example, a resource requesting unit 111, a screen generation unit 112, and a screen outputting unit 113 which function by executing the first application 110. In addition to the above components which function by executing the first application 110, the first application 110 may have an authentication instruction unit not illustrated in the first application 110 in FIG. 1 which functions by executing the first application 110.

The second application 120 has a function of, by being executed, controlling the timing at which to cause the authentication server 12 to perform the processing of authenticating a user (authentication processing) according to a state of the first application 110. Specifically, the second application 120 has, for example, a state obtaining unit 121, an authentication determination unit 122, an authentication instruction unit 123, and an authentication obtaining unit 124 which function by executing the second application 120. Note that Embodiment 1 will be described on the assumption that the second application 120 has the authentication instruction unit 123 which functions by executing the second application 120. However, the authentication instruction unit 123 is not necessarily limited to one which functions by executing the second application 120. In a case where the second application 120 does not have the authentication instruction unit 123 which functions by executing the second application 120, the authentication instruction unit 123 may be one which functions by executing the first application 110. Processes by units which function by executing the first application 110 and the second application 120 will be described later.

The processes by the units which function by executing the information processing apparatus 100 are implemented by hardware such as an application specific integrated circuit (ASIC) incorporated in the information processing apparatus 100. The above processes may be implemented by hardware such as a field programmable gate array (FPGA). Alternatively, the above processes may be implemented by software using a memory such as random access memory (RAM) and a processor such as central processing unit (CPU). Details of the processes by the units which function in the information processing apparatus 100 will be described later.

Figure 2:
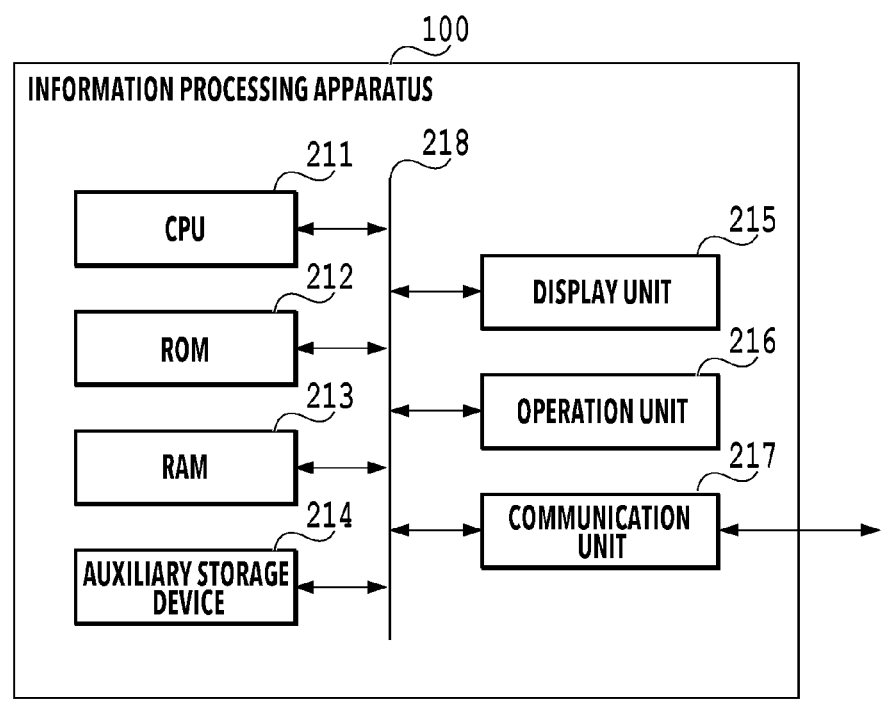
FIG. 2 is a block diagram illustrating an example of the hardware configuration of an information processing apparatus according to one or more aspects of the present disclosure.

Now, a hardware configuration of the information processing apparatus 100 in the case where the units which function in the information processing apparatus 100 operate as pieces of software will be described with reference to FIG. 2. FIG. 2 is a block diagram illustrating an example of the hardware configuration of the information processing apparatus 100 according to Embodiment 1. The information processing apparatus 100 is a computer. As exemplarily illustrated in FIG. 2, this computer has a CPU 211, a ROM 212, a RAM 213, an auxiliary storage device 214, a display unit 215, an operation unit 216, a communication unit 217, and a bus 218.

The CPU 211 is a processor that controls the computer by using programs or data stored in the ROM 212 or the RAM 213 such that the computer causes the units which function in the information processing apparatus 100 illustrated in FIG. 1 to function. Note that the information processing apparatus 100 may have one or more dedicated pieces of hardware other than the CPU 211, and at least part of processing by the CPU 211 may be executed by the dedicated pieces of hardware. Examples of the dedicated pieces of hardware include an ASIC, an FPGA, a digital signal processor (DSP), and the like. The ROM 212 is a memory storing programs requiring no change and the like. The RAM 213 is a memory that temporarily stores programs or data supplied from the auxiliary storage device 214, data externally supplied via the communication unit 217, or the like. The auxiliary storage device 214 is, for example, a hard disk drive and stores various pieces of data such as pieces of image data or audio data.

The display unit 215 is, for example, a liquid crystal display, an LED display, or the like and displays graphical user interfaces (GUIs) for a user to operate the information processing apparatus 100 or browse the status of processing in the information processing apparatus 100. The operation unit 216 is, for example, a keyboard, a mouse, a joystick, a touch panel, or the like and inputs various instructions into the CPU 211 in response to receiving the user's operations. The CPU 211 also operates as a display control unit that controls the display unit 215 and as an operation control unit that controls the operation unit 216.

The communication unit 217 is used for communication between the information processing apparatus 100 and external apparatuses. For example, in a case where the information processing apparatus 100 is wired-connected to an external apparatus, a communication cable is connected to the communication unit 217. In a case where the information processing apparatus 100 has a function of wirelessly communicating with an external apparatus, the communication unit 217 includes an antenna. The bus 218 links the CPU 211, the ROM 212, the RAM 213, the auxiliary storage device 214, the display unit 215, the operation unit 216, and the communication unit 217 included in the information processing apparatus 100 and transfers information to or from them. Embodiment 1 will be described on the assumption that the display unit 215 and the operation unit 216 are present inside the information processing apparatus 100. However, at least one of the display unit 215 or the operation unit 216 may be present as a separate apparatus outside the information processing apparatus 100.

Figure 3:
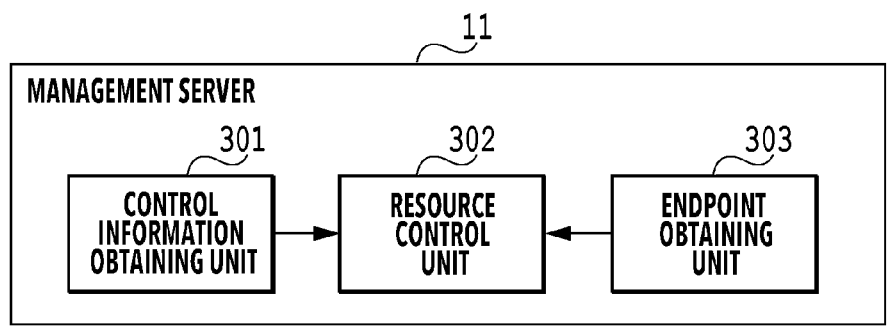
FIG. 3 is a block diagram illustrating an example of the configuration of a management server according to one or more aspects of the present disclosure.

Configurations of the management server 11 and the authentication server 12 will be described with reference to FIGS. 3 and 4. FIG. 3 is a block diagram illustrating an example of the configuration of the management server 11 according to Embodiment 1. The management server 11 has a control information obtaining unit 301, a resource control unit 302, and an endpoint obtaining unit 303. The management server 11 is, for example, a computer having the pieces of hardware exemplarily illustrated in FIG. 2, and the processes by the units included in the management server 11 are implemented by these pieces of hardware.

The control information obtaining unit 301 obtains information output from the information processing apparatus 100, which is for the information processing apparatus 100 to access a managed resource, through the Internet 15 or the like. The endpoint obtaining unit 303 obtains an application programming interface (API) endpoint. For example, the endpoint obtaining unit 303 obtains an API endpoint by reading information on the API endpoint out of a storage device not illustrated in FIG. 3. Here, the API endpoint is a uniform resource identifier (URI) associated with an individual managed resource for accessing that managed resource. The information processing apparatus 100 can access the managed resource by making a request via the Hypertext Transfer Protocol (HTTP) or the like to the API endpoint. In sum, the information obtained by the control information obtaining unit 301 is information representing a request via HTTP or the like and is information for the information processing apparatus 100 to access a managed resource.

The resource control unit 302 manages or controls a managed resource based on the information obtained by the control information obtaining unit 301 and the API endpoint obtained by the endpoint obtaining unit 303. For example, in a case where the information obtained by the control information obtaining unit 301 is a request to obtain document data managed by the management server 11, the resource control unit 302 obtains this document data by using the API endpoint corresponding to the document data. Note that managed resources such as document data are stored, for example, in the storage device not illustrated in FIG. 3, and the resource control unit 302 uses an API endpoint to read and obtain the data corresponding to the API endpoint out of the storage device.

As described above, managed resources are not limited to data of documents or the like. For example, a managed resource may be an external apparatus such as a printer connected to the management server 11 directly or indirectly through the network 13 or the like, as long as the managed resource is managed by the management server 11. In a case where a managed resource is, for example, a printer, the information processing apparatus 100 can cause this printer to print an image represented by desired data via the management server 11 by making a request via HTTP or the like.

Figure 4:
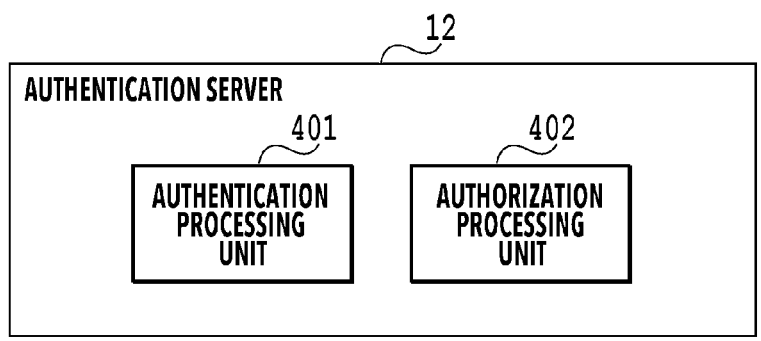
FIG. 4 is a block diagram illustrating an example of the configuration of an authentication server according to one or more aspects of the present disclosure.

FIG. 4 is a block diagram illustrating an example of the configuration of the authentication server 12 according to Embodiment 1. The authentication server 12 has an authentication processing unit 401 and an authorization processing unit 402. The authentication server 12 is, for example, a computer having the pieces of hardware exemplarily illustrated in FIG. 2, and the processes by the units included in the authentication server 12 are implemented by these pieces of hardware.

The authentication processing unit 401 specifies who a user is. Specifically, for example, the authentication processing unit 401 holds pieces of information such as identifications (IDs) or passwords for identifying a plurality of users as pieces of authentication information of these individual users. For example, the authentication processing unit 401 obtains a piece of authentication information input via a user's input operation from the information processing apparatus 100. Moreover, the authentication processing unit 401 specifies the user by referring to the plurality of pieces of authentication information held for individual users and verifying which user's authentication information the obtained piece of authentication information matches. In the following description, the processing of specifying a user by the authentication processing unit 401 will be referred to as "authentication processing".

The authorization processing unit 402 grants authority to access a managed resource to the user authenticated by the authentication processing unit 401. In the following description, the processing of granting authority to access a managed resource by the authentication processing unit 401 will be referred to as "authorization processing". For example, with OAuth, which is a standard protocol, an explicit authorization from a user is required in order for the management server 11 to access a managed resource in response to a request via HTTP or the like from the information processing apparatus 100. Specifically, with a configuration using OAuth, in a case where a user requests the authorization processing unit 402 to perform the authorization processing by using the information processing apparatus 100, the authorization processing unit 402 issues an access token for the management server 11 to access a managed resource to the information processing apparatus 100. By making a request via HTTP or the like with this access token, the information processing apparatus 100 can access the managed resource corresponding to the API endpoint.

Referring back to FIG. 1, the units which function by executing the first application 110 will be described. The resource requesting unit 111 makes a request to the management server 11 to perform an operation such as reading, changing, adding, deleting, or controlling a managed resource. For example, the resource requesting unit 111 makes this request to the management server 11 by outputting information representing the request to the management server 11. The screen generation unit 112 generates an image representing a screen such as an operation screen corresponding to a response from the management server 11 for the request made to the management server 11 or generates information from which this screen can be generated. The screen outputting unit 113 outputs the image or information generated by the screen generation unit 112.

The units which function by executing the second application 120 will be described. The state obtaining unit 121 obtains a state of the first application 110. The authentication determination unit 122 determines whether to perform the authentication processing according to the state of the first application 110 obtained by the state obtaining unit 121. The authentication instruction unit 123 issues an instruction to perform the authentication processing to the authentication server 12 in a case where the authentication determination unit 122 determines that the authentication processing is to be performed. In the following description, the instruction to perform the authentication processing will be referred to as "authentication instruction". The authentication instruction unit 123 may issue the authentication instruction to the authentication server 12 directly or via the management server 11. The authentication obtaining unit 124 obtains authentication information to be sent to the management server 11 or the authentication server 12 in the case where the authentication instruction unit 123 issues the instruction to perform the authentication processing. Specifically, the authentication obtaining unit 124 obtains, for example, information such as an ID or password input by a user operating an operation input device not illustrated in FIG. 1 as the authentication information. The following description will be given on the assumption that the authentication instruction unit 123 makes a request to perform the authorization processing in addition to issuing the authentication instruction.

Figure 5:
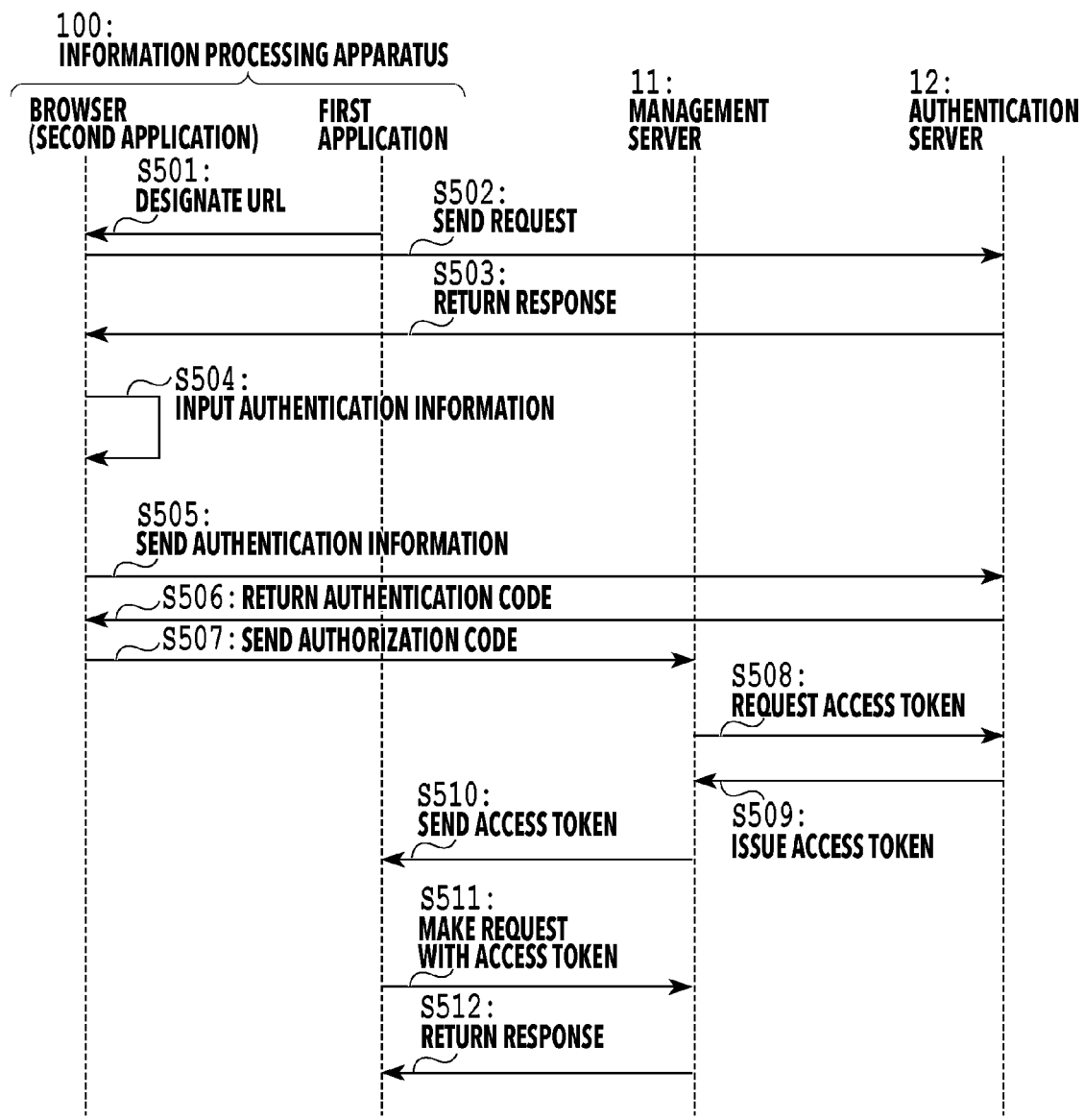
FIG. 5 is a sequence chart illustrating an example of a processing sequence according to one or more aspects of the present disclosure.

Processing sequences of the authentication processing and the authorization processing in the information processing system 1 will be described with reference to FIGS. 5 and 7. FIG. 5 is a sequence chart illustrating an example of a processing sequence in the information processing system 1 according to Embodiment 1. Note that each symbol "S" in the description of FIG. 5 means a step.

The sequence chart illustrated in FIG. 5 is an example based on a case where the first application 110 and the second application 120 operate as web applications that operate in the information processing apparatus 100. For example, the first application 110 and the second application 120 are written in a script language executable by a browser application (hereinafter referred to as "browser") and executed by a browser operating in the information processing apparatus 100. The browser-executable script language is, for example, JavaScript (registered trademark) or Cascading Style Sheets (CSS). Note that the browser-executable script language is not limited to JavaScript (registered trademark) or CSS.

The first application 110 and the second application 120 may operate in an information processing apparatus 100 operating as an application server. In this case, information for constructing GUIs to be generated by the first application 110 and the second application 120 is output to and presented on an apparatus not illustrated in FIG. 1 such as a personal computer, tablet terminal, or smartphone used by a user. In the following description, the apparatus such as a personal computer, tablet terminal, or smartphone used by the user will be referred to as "user apparatus". The browser operating in the user apparatus renders the information for constructing the GUIs to be generated by the first application 110 and the second application 120 to display the GUIs on a display device connected to the user apparatus. In response to the user performing an input operation on the user apparatus, the browser operating in the user apparatus sends a request to the first application 110 and the second application 120 operating in the information processing apparatus 100 to issue instructions to execute corresponding operations. The first application 110 and the second application 120 operate in accordance with the requests from the browser and present the results of their operations to the browser.

The following description will be given on the assumption that the first application 110 and the second application 120 are written in a script language executable by a browser and operate by being executed by the browser operating in the information processing apparatus 100. In FIG. 5, before the process of S501 is executed, the first application 110 makes a request to the management server 11 or the like. The management server 11 or the like receives the request from the first application 110 and returns a redirect HTTP response for the request.

In the case where there is an HTTP response from the management server 11 or the like, then in S501, an URL for requesting information containing the second application 120 from a website that provides the second application 120 is designated in the browser. Specifically, this URL is the endpoint of the authentication server 12, and is designated by returning a redirect HTTP response for the request to the management server 11 or the like from the first application 110. Then, in S502, the browser sends a request to the website via the designated URL to request the information containing the second application 120.

Then, in S503, as a response to the request from the browser, the website sends the information containing the second application 120 to the browser by returning a redirect HTTP response to the browser. The browser receives the information containing the second application 120 and executes a script contained in the information, thereby executing the second application 120 and causing the second application 120 to operate. By executing the second application 120, the browser displays a screen for issuing an authentication instruction (hereinafter referred to as "authentication screen") to the authentication server 12 as a GUI on the display device.

Figure 6:
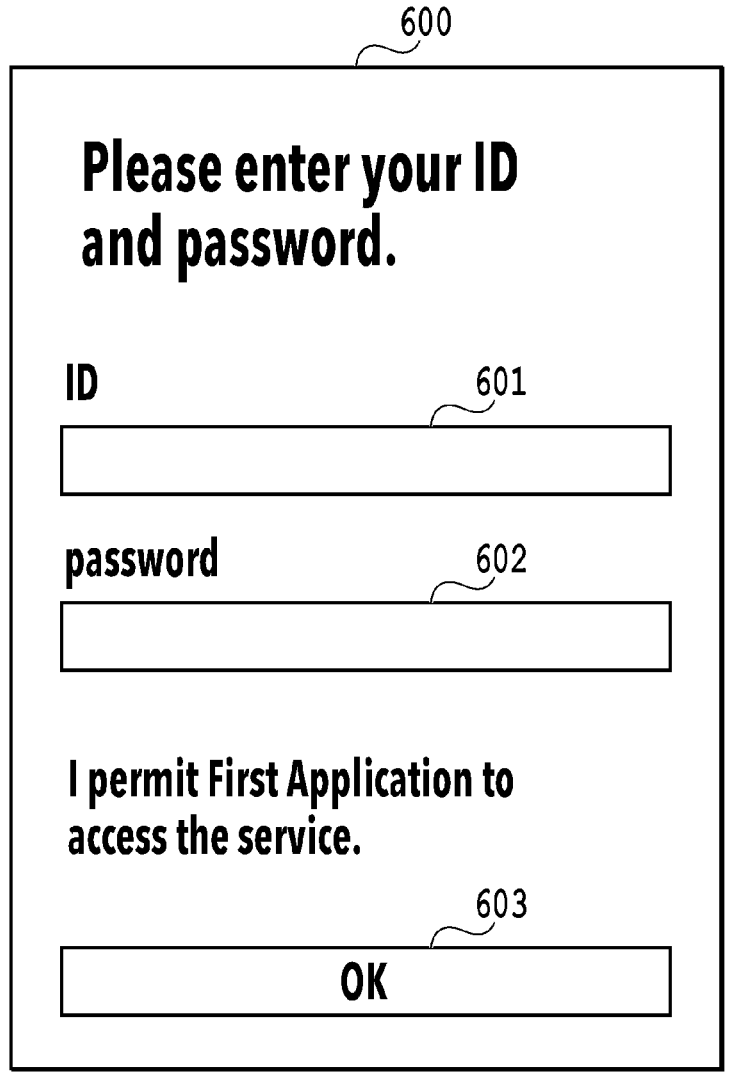
FIG. 6 is an explanatory diagram for explaining an example of an authentication screen according to one or more aspects of the present disclosure.

The authentication screen will be described with reference to FIG. 6. FIG. 6 is an explanatory diagram for explaining an example of the authentication screen according to Embodiment 1. In Embodiment 1, an authentication screen 600 illustrated in FIG. 6 is a GUI provided by executing the second application 120 and is a GUI displayed on the browser. The authentication screen 600 includes a region 601 for displaying an ID input via a user's input operation, a region 602 for displaying a password input via the user's input operation, and a button 603 for performing an input operation indicating the user's intention to complete inputting an ID and a password. Also, the sentence "I permit First Application to access the service." contained in the authentication screen 600 illustrated in FIG. 6 represents the explicit authorization from the user mentioned earlier. Note that the authentication screen 600 illustrated in FIG. 6 is a mere example, and the authentication screen 600 is not limited to the one illustrated in FIG. 6.

Then, in S504, the user sees the authentication screen 600 displayed on the browser, inputs an ID and a password as authentication information, and thereafter presses the button 603. Note that "presses" mentioned above means, for example, an input operation such as placing a pointer with a pointing device at any position within the region where the button 603 is displayed and clicking the position, or tapping the position by using a touch sensor. The user's operation of pressing the button 603 is an explicit authorization from the user. In response to pressing the button 603, the authentication information input by the user is obtained by the authentication obtaining unit 124. Then, in S505, the browser with the second application 120 operating therein sends the ID and password input by the user as authentication information to the authentication server 12 to issue an authentication instruction. The authentication instruction unit 123 issues this authentication instruction. Note that the authentication instruction may be issued to the authentication server 12 via the management server 11. In this case, the browser with the second application 120 operating therein issues the authentication instruction to the management server 11. Further, the management server 11 receives the authentication instruction from the browser and issues to an authentication instruction to the authentication server 12. In the case of issuing the authentication instruction to the authentication server 12 via the management server 11, the management server 11 has an instruction relay unit not illustrated in FIG. 3 which receives the authentication instruction and issues an authentication instruction based on the received authentication instruction to the authentication server 12.

In one example, the second application 120 executed by the browser obtains a state of the first application 110 before sending the authentication information to the authentication server 12. The state obtaining unit 121 obtains the state of the first application 110. Further, based this state, the second application 120 determines whether to issue an authentication instruction to the authentication server 12. The authentication determination unit 122 makes this determination. The type of state of the first application 110 obtained by the state obtaining unit 121 and how the authentication determination unit 122 makes the determination based on the state of the first application 110 will be described later. If it is determined that an authentication instruction is to be issued to the authentication server 12, the authentication instruction unit 123 sends the authentication information to issue the authentication instruction to the authentication server 12. If it is determined that no authentication instruction is to be issued to the authentication server 12, the second application 120 does not send the authentication information and, for example, displays a GUI on the browser indicating a state where authentication is not possible.

Note that the timing to obtain the state of the first application 110 and the timing to determine whether to issue an authentication instruction mentioned above are an example, and the timings are not limited to the ones mentioned above. For example, the above obtaining and determining may be performed when the second application 120 is executed in S503. In this case, if it is determined that no authentication instruction is be issued to the authentication server 12, the second application 120 may, for example, display the GUI on the browser indicating a state where authentication is not possible, instead of the authentication screen exemplarily illustrated in FIG. 6.

Then, in S506, the authentication server 12 receives the authentication information sent from the browser with the second application 120 operating therein. Based on this authentication information, which was input by the user, the authentication server 12 specifies the user by verifying the information and returns an authorization code corresponding to the specified user to the browser with the second application 120 operating therein. This returning is performed, for example, with a redirect HTTP response, and the API endpoint to access the managed resources of the management server 11 is designated in the redirect URL. Here, the authorization code is temporary authentication information issued from an authorization endpoint of the authentication server 12. Then, in S507, the browser with the second application 120 operating therein receives the authorization code returned from the authentication server 12 and redirects the authorization code to the management server 11. The browser with the second application 120 operating therein may send the authenticated user's credential to the management server 11 in addition to the authorization code.

Then, in S508, the management server 11 receives the authorization code sent from the browser and requests an access token from the authentication server 12 by using the received authorization code. In the case where the browser sends the credential to the management server 11, the management server 11 may receive the authorization code and the credential and request an access token from the authentication server 12 by using the received authorization code and credential. In the management server 11, a token requesting unit not illustrated in FIG. 3, for example, performs the process of requesting an access token from the authentication server 12. Then, in S509, the authentication server 12 issues an access token to the management server 11. Then, in S510, the management server 11 receives the access token issued from the authentication server 12 and sends the received access token to the first application 110 operating as a web application in the information processing apparatus 100.

Then, in S511, the user sees a GUI displayed by executing the first application 110 operating as the web application and performs an input operation to cause the first application 110 to perform a process corresponding to the input operation. The first application 110 makes a request using the API endpoint with the access token to the management server 11 as the process corresponding to the input operation. The resource requesting unit 111 makes this request.

Then, in S512, the management server 11 receives the request and returns a response for the received request to the first application 110 operating as the web application. The first application 110 receives the response and performs a predetermined process. Thereafter, the first application 110 generates information for constructing a GUI after this process, and displays this GUI on the browser with the first application 110 operating therein. Like the above description, this information is generated by the screen generation unit 112 and output by the screen outputting unit 113. The browser with the first application 110 operating therein generates the GUI by rendering the information and displays the GUI on the display device. Thereafter, the processes of S511 and S512 are repeated, thereby enabling the user to perform a desired process such as browsing, editing, or printing an image, a document, or the like. In a case where the access token sent in S511 is incorrect, the management server 11, for example, returns information representing an error indicating that there is not authority such as access authority to the first application 110 in S512. In this case, for example, the first application 110 may generate information for constructing a GUI indicating that there is not authority such as access authority, and the browser with the first application 110 operating therein may render this GUI and display it on the display device.

Figure 7:
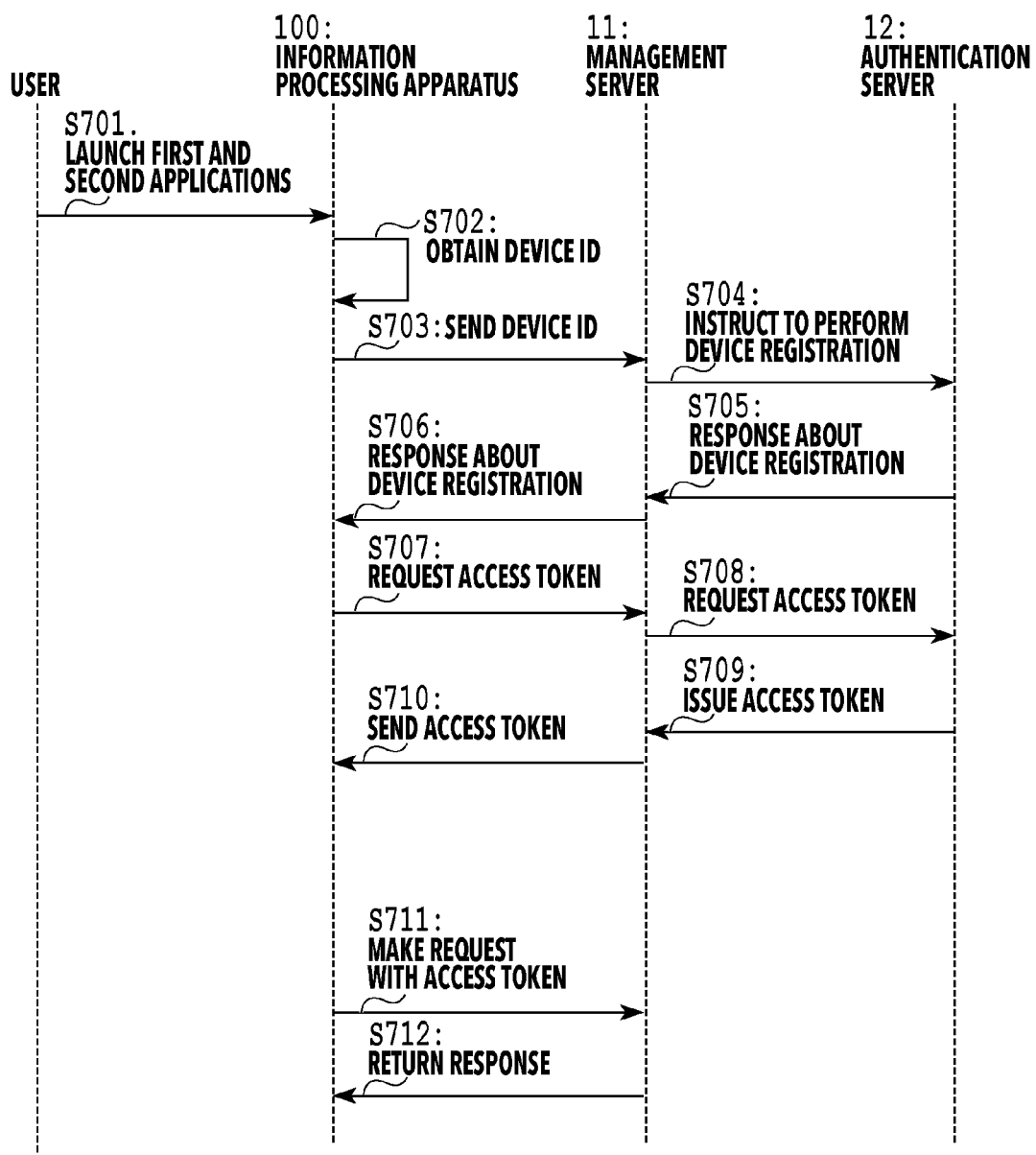
FIG. 7 is a sequence chart illustrating another example of the processing sequence according to one or more aspects of the present disclosure.

FIG. 7 is a sequence chart illustrating another example of the processing sequence in the information processing system 1 according to Embodiment 1. The sequence chart illustrated in FIG. 7 is an example based on a case where the first application 110 and the second application 120 operate as native applications that operate in the information processing apparatus 100. The first application 110 and the second application 120 operate in a state of being installed in an operating system (OS) such as Windows (registered trademark), macOS (registered trademark), iOS (registered trademark), or Android (registered trademark). After being installed, the first application 110 and the second application 120 operate as resident applications that reside and operate in the information processing apparatus 100. Note that each symbol "S" in the description of FIG. 7 means a step.

The following description will be given on the assumption that the first application 110 and the second application 120 each generate and display GUIs on the display device not illustrated in FIG. 1 connected to the information processing apparatus 100. However, the present disclosure is not limited to this. For example, the first application 110 and the second application 120 may be plug-in programs added on to expand the functionality of the browser operating in the information processing apparatus 100. In this case, the first application 110 and the second application 120 as plug-in programs generate GUIs displayable on the browser as with native applications by being installed in an OS and added on to the browser. The browser renders the GUI generated by the first application 110 and the second application 120 and displays them on the display device.

In S701, the user launches the first application 110 and the second application 120. After the first application 110 and the second application 120 are launched, the information processing apparatus 100 obtains an ID with which the information processing apparatus 100 can be specified (hereinafter referred to as "device ID") in S702. For example, the information processing apparatus 100 obtains the media access control (MAC) address given to a network card included in the information processing apparatus 100 or the like as the device ID. This obtaining is performed by, for example, executing the second application 120. Note that the device ID is designed to specify the information processing apparatus 100 used by a user and can therefore be used as authentication information. In other words, the device ID is obtained as authentication information by executing the second application 120.

Then, in S703, the information processing apparatus 100 sends the device ID to the management server 11 to request device registration. This request is made by, for example, executing the second application 120. In other words, requesting device registration mentioned above is an example of issuing an authentication instruction. Note that, before requesting device registration in S703, the second application 120 obtains a state of the first application and determines whether to request device registration, i.e., whether to issue an authentication instruction, based on the obtained state of the first application. If it is determined that an authentication instruction is to be issued, the information processing apparatus 100 executes S703. The type of state of the first application obtained by the second application 120 and how it determines whether to issue an authentication instruction will be described later. Then, in S704, the management server 11 receives the device ID sent from the information processing apparatus 100 and sends the received device ID to the authentication server 12 to issue an instruction to perform device registration of the information processing apparatus 100. The authentication server 12 receives the device ID sent from the management server 11 and performs device registration of the information processing apparatus 100 by using the received device ID.

After the device registration of the information processing apparatus 100 is completed, the authentication server 12 returns a response indicating that the device registration has been properly done to the management server 11 in S705. Then, in S706, the management server 11 returns a response indicating that the device registration has been properly done to the information processing apparatus 100. Then, in S707, the information processing apparatus 100 requests an access token from the management server 11. This request is made by, for example, executing the first application. Then, in S708, the management server receives the request from the information processing apparatus 100 and requests an access token from the authentication server 12. Then, in S709, the authentication server 12 receives the request from the management server 11 and issues an access token to the management server 11. Then, in S710, the management server 11 receives the access token issued from the authentication server 12 and sends the access token to the information processing apparatus 100. The information processing apparatus 100 receives the access token sent from the management server 11.

Then, in S711, using the access token received from the management server 11, the information processing apparatus 100 makes a request using the API endpoint with the access token to the management server 11. This request is made by executing the first application. Then, in S712, the management server 11 receives the request with the access token from the information processing apparatus 100 and returns a response for this request to the information processing apparatus 100. Thereafter, the processes of S711 and S712 are repeated, thereby enabling the user to perform a desired process such as browsing, editing, or printing an image, a document, or the like. In a case where the access token sent in S711 is incorrect, the management server 11, for example, returns information representing an error indicating that there is not authority such as access authority to the information processing apparatus 100 in S712.

The processing sequences of the authentication processing and the authorization processing illustrated in FIGS. 5 and 7 are mere examples. In the present disclosure, the processing sequence of the authentication processing and the authorization processing is not limited to these. For example, the processing sequence of the authentication processing and the authorization processing may be a processing sequence specified by a protocol such as OpenID Connect or OAuth.

Controlling of the timing of the authentication processing according to a state of the first application 110 will be described with reference to FIGS. 8 to 9E. FIG. 8 is a sequence chart illustrating an example of the processing sequence of the authentication processing and the authorization processing in the information processing system 1 according to Embodiment 1. The sequence chart illustrated in FIG. 8 is an example based on the case where the first application 110 and the second application 120 operate as native applications that operate in the information processing apparatus 100. The first application 110 and the second application 120 are installed into the OS operating in the information processing apparatus 100 by executing an application for installation (hereinafter referred to as "installer"). Note that each symbol "S" in the description of FIG. 8 means a step.

In S801, a user instructs the OS operating in the information processing apparatus 100 to execute the installer to instruct the OS to start installing the first application 110 and the second application 120 with the installer. In response to the user's instruction to start the installation, the installer is executed to install the first application 110 in S802. Then, in S803, the installer installs the second application 120. After the installation of the second application 120 is completed, the installer launches the second application 120 in S804.

After S804, the second application 120 determines whether the first application 110 is in a launched state. The state obtaining unit 121 obtains the state of the first application 110, and the authentication determination unit 122 makes the above determination. If it is determined that the first application 110 is not in a launched state, the second application 120 repeats determining whether the first application 110 is in a launched state in S807 each time a predetermined period elapses until the first application 110 is launched.

In S805, the user issues an instruction to launch the first application 110, for example. In this case, after S805, the second application 120 determines that the first application 110 is in a launched state. If it is determined that the first application 110 is in a launched state, the second application 120 issues an authentication instruction to the management server 11 in S808. The authentication instruction unit 123 issues this instruction. Then, in S809, the management server 11 receives the instruction from the second application 120 and issues an authentication instruction to the authentication server 12. Then, in S810, the authentication server 12 receives this instruction from the management server 11 and performs authentication processing corresponding to the instruction. Thereafter, the user, for example, issues an instruction to terminate the first application 110 in S806.

The processing sequence illustrated in FIG. 8 has been described on the assumption that the second application 120 issues an authentication instruction to the management server 11. However, the present disclosure is not limited to this sequence. For example, when the first application 110 is launched, the first application 110 may issue an authentication instruction to the management server 11 or the authentication server 12 and the second application 120 may operate using the resultant authentication information.

Also, the processing sequence illustrated in FIG. 8 has been described based exemplarily on a configuration where the authentication determination unit 122 checks whether the first application 110 is in a launched state. However, the present disclosure is not limited to this configuration. For example, the second application 120 may issue an authentication instruction to the management server 11 or the authentication server 12 in response to detection of a predetermined event occurring as a result of executing the first application 110. Specifically, for example, the state obtaining unit 121 detects and obtains an event occurring as a result of executing the first application 110. The authentication determination unit 122 determines whether the event obtained by the state obtaining unit 121 is the predetermined event. In short, the authentication determination unit 122 determines whether the predetermined event has occurred as a result of executing the first application 110. If the authentication determination unit 122 determines that the predetermined event has occurred as a result of executing the first application 110, the authentication instruction unit 123 issues an authentication instruction. Here, the predetermined event is, for example, an event occurring as a result of the first application 110 issuing an instruction to start printing to the printer being a managed resource managed by the management server 11.

Figure 9A:
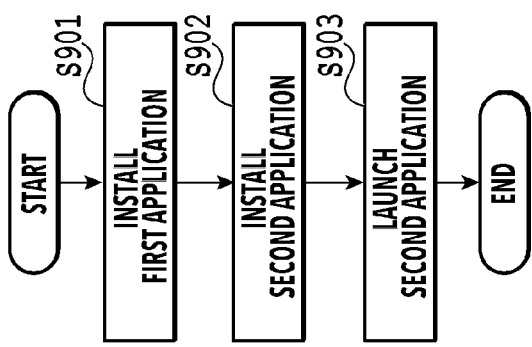
FIG. 9A is a flowchart illustrating an example of a processing flow in an installer according to one or more aspects of the present disclosure.

FIGS. 9A to 9E are flowcharts illustrating an example of processing flows in the applications and the servers in the information processing system 1 according to Embodiment 1 until the completion of the authentication processing. Note that each symbol "S" in the description of FIGS. 9A to 9E means a step. FIG. 9A is a flowchart illustrating an example of the processing flow in the installer according to Embodiment 1. Firstly, in S901, the installer installs the first application 110. Then, in S902, the installer installs the second application 120. Then, in S903, the installer launches the second application 120. After S903, the installer terminates the processing of the flowchart illustrated in FIG. 9A.

Figure 9B:
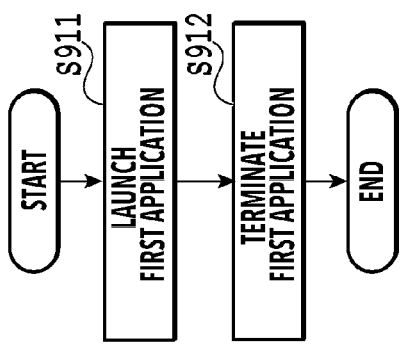
FIG. 9B is a flowchart illustrating an example of a processing flow in a first application according to one or more aspects of the present disclosure.

FIG. 9B is a flowchart illustrating an example of the processing flow in the first application 110 according to Embodiment 1. Firstly, in S911, the first application 110 is launched by a user operation, thereby starting operating. Then, in S912, the first application 110 is terminated by a user operation, thereby finishing operating. After S912, the first application 110 terminates the processing of the flowchart illustrated in FIG. 9B.

Figure 9C:
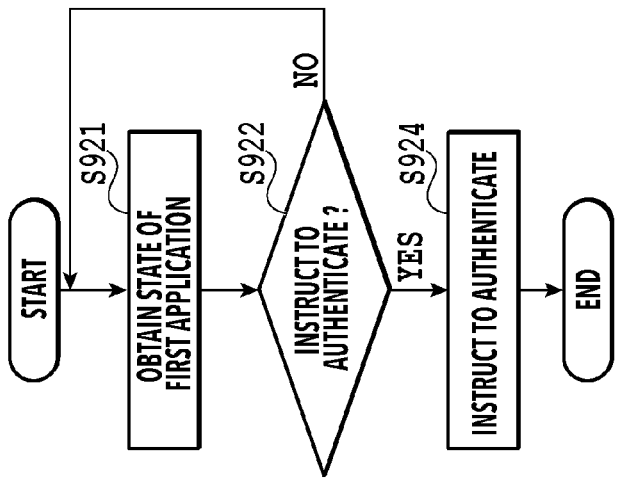
FIG. 9C is a flowchart illustrating an example of a processing flow in a second application according to one or more aspects of the present disclosure.

FIG. 9C is a flowchart illustrating an example of the processing flow in the second application 120 according to Embodiment 1. Firstly, in S921, the second application 120 obtains a state of the first application 110. Specifically, by executing the second application 120, the state obtaining unit 121 obtains the state of the first application 110. Here, the state of the first application 110 is, for example, whether the first application 110 has been launched or whether a given event has occurred as a result of executing the first application 110. The state of the first application 110 is not limited to the above. For example, the state of the first application 110 may be whether the first application 110 has been installed and ready to be executed, whether the first application 110 has ever been launched at least once, or the like.

After S921, the second application 120 determines in S922 whether to issue an authentication instruction according to the state of the first application 110. If the first application 110 has not been launched, the second application 120 determines that no authentication instruction is to be issued, for example. If determining in S922 that no authentication instruction is to be issued, the second application 120 returns to the process of S921 and checks whether the first application 110 is a launched state again after the elapse of a predetermined period, for example. In this case, the second application 120 may terminate the processing of the flowchart illustrated in FIG. 9C. If the first application 110 is in a launched state, the second application 120 determines that an authentication instruction is to be issued. If it is determined in S922 that an authentication instruction is to be issued, the second application 120 issues an authentication instruction to the management server 11 in S924. After S924, the second application 120 terminates the processing of the flowchart illustrated in FIG. 9C.

Figure 9D:
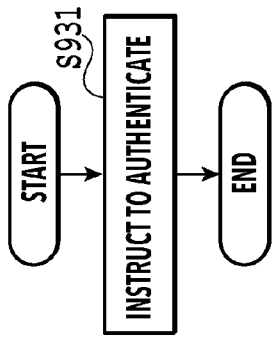
FIG. 9D is a flowchart illustrating an example of a processing flow in a management server according to one or more aspects of the present disclosure.

FIG. 9D is a flowchart illustrating an example of the processing flow in the management server 11 according to Embodiment 1. Firstly, in S931, the management server 11 issues an authentication instruction to the authentication server 12. The process of S931 is executed in the case where the management server 11 receives an authentication instruction from the second application 120 in the process of S924 illustrated in FIG. 9C. After S931, the management server 11 terminates the processing of the flowchart illustrated in FIG. 9D.

Figure 9E:
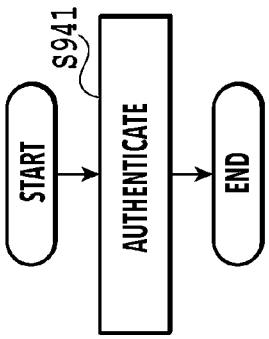
FIG. 9E is a flowchart illustrating an example of a processing flow in the authentication server according to one or more aspects of the present disclosure.

FIG. 9E is a flowchart illustrating an example of the processing flow in the authentication server 12 according to Embodiment 1. Firstly, in S941, the authentication server 12 performs the authentication processing. The process of S941 is executed in the case where the authentication server 12 receives an authentication instruction from the management server 11 in the process of S931 illustrated in FIG. 9D. After S941, the authentication server 12 terminates the processing of the flowchart illustrated in FIG. 9E.

As described above, the information processing system 1 determines whether to cause the second application 120 to issue an authentication instruction according to a state of the first application 110. In other words, the information processing system 1 can control the timing to issue an authentication instruction according to a state of the first application 110. Thus, with the information processing system 1, even if the number of users of the first application 110, which needs to use an authentication service, increases, it is possible to curb the number of users who actually use the authentication service. Accordingly, with the information processing system 1, it is possible to lower the ratio of the number of users of an authentication service to the number of users of an application which uses the authentication service (e.g., first application).

Incidentally, some authentication services provided from public clouds charge a usage fee corresponding to the number of users authenticated (hereinafter referred to as "authenticated users") in a predetermined period to providers of applications using these authentication services. Thus, if the number of users of an application using such an authentication service increases, the number of authenticated users increases too. Accordingly, the provider will have to pay a high usage fee for using the authentication service if the number of users of the application using the authentication service increases. As mentioned above, with the information processing system 1, even if the number of users of the first application 110, which needs to use an authentication service, increases, it is possible to curb the number of users who actually use the authentication service. Hence, in the case of using an authentication service as above, the information processing system 1 can reduce the usage fee to be paid as compared to conventional methods.

Embodiment 2

Figure 10:
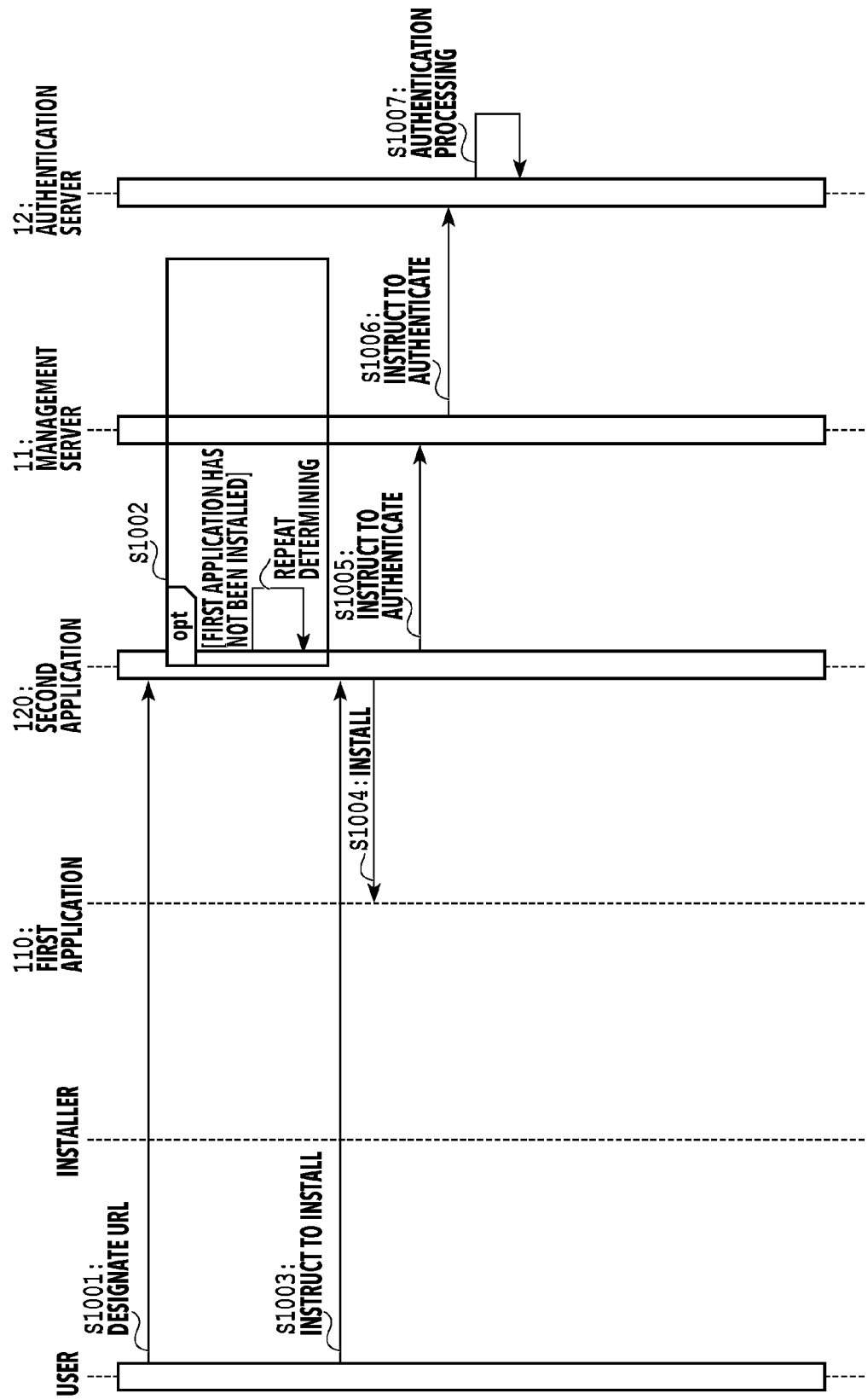
FIG. 10 is a sequence chart illustrating an example of the processing sequence of authentication processing according to one or more aspects of the present disclosure.

An information processing system 1 according to Embodiment 2 will be described with reference to FIG. 10. The configuration of the information processing system 1 according to Embodiment 2 is similar to the configuration described in Embodiment 1 with reference to FIG. 1, and description thereof will therefore be omitted. Controlling of the timing to issue an authentication instruction according to a state of the first application 110 according to Embodiment 2 will be described with reference to FIG. 10. FIG. 10 is a sequence chart illustrating an example of the processing sequence of the authentication processing and the authorization processing in the information processing system 1 according to Embodiment 2. Note that each symbol "S" in the description of FIG. 10 means a step.

The sequence chart illustrated in FIG. 10 is an example based on a case where the first application 110 operate as a native application and the second application 120 operate as a web application that operate respectively in the information processing apparatus 100. By executing the second application 120, the first application 110 is installed into the OS operating in the information processing apparatus 100. The first application 110 may be installed into the OS operating in the information processing apparatus 100 as a plug-in program to be added on to the browser operating in the information processing apparatus 100. In this case, the first application 110 operates by being executed by the browser. The following description will be given on the assumption that the first application 110 is a native application that operates in the information processing apparatus 100.

The second application 120 is a web application provided from a website and written in a script language executable by the browser operating in the information processing apparatus 100. In this case, the second application 120 operates by being executed via rendering by the browser. The browser displays the GUI exemplarily illustrated in FIG. 6 on the display device not illustrated in FIG. 1 by executing the second application 120. A user can issue an instruction to execute the authentication processing and the authorization processing via the browser by performing an input operation on the information processing apparatus 100.

The second application 120 may be a web application that operates in an application server not illustrated in FIG. 1, for example. In this case, the second application 120 may operate in the management server 11 illustrated in FIG. 1. Moreover, in this case, the GUI exemplarily illustrated in FIG. 6, which is provided by executing the second application 120, is displayed on the browser operating in the information processing apparatus 100. In this case, the user can cause the second application to issue an instruction to execute the authentication processing and the authorization processing via the browser by performing an input operation on the information processing apparatus 100. The following description will be given on the assumption that the second application 120 is a web application written in a script language executable by the browser operating in the information processing apparatus 100.

Firstly, in S1001, the user designates the URL of the website that provides the second application 120 in the browser. The browser sends a request to the website via the designated URL. Then, in S1002, the second application 120 is executed by being rendered by the browser, and obtains a state of the first application 110. Specifically, the second application 120, for example, obtains information on whether the first application 110 is in a state of being installed in the information processing apparatus 100. The state obtaining unit 121 performs this obtaining.

Based on the state of the first application 110, the second application 120 determines whether to issue an authentication instruction. Specifically, the second application 120, for example, obtains information indicating whether the first application 110 has been installed and determines whether to issue an authentication instruction based on this information. The second application 120 determines that an authentication instruction is to be issued if the first application 110 has been installed, and determines that no authentication instruction is to be issued if the first application 110 has not been installed. If the first application 110 has not been installed, the second application 120 may, for example, repeat obtaining the information on whether the first application 110 has been installed and making the above determination each time a predetermined period elapses until the first application 110 is installed. In this case, the second application 120 may, for example, generate a GUI prompting the user to install the first application 110, and display the GUI on the browser.

Then, in S1003, the user issues an instruction to install the first application 110 to the second application 120. Then, in S1004, the second application 120 receives this instruction and installs the first application 110 into the information processing apparatus 100. The second application 120 may repeat determining whether the installation of the first application 110 has been completed each time a predetermined period elapses until the installation of the first application 110 is completed. In response to the first application 110 reaching an installed state, the second application 120 generates information for constructing the authentication screen 600 exemplarily illustrated in FIG. 6. The browser renders this information to display the authentication screen 600 exemplarily illustrated in FIG. 6 on the display device. The user sees the authentication screen 600 displayed on the browser, inputs an ID and a password, and thereafter presses the button 603.

Then, in S1005, the second application 120 sends the ID and password input by the user via the browser as authentication information to the management server 11 to issue an authentication instruction to the management server 11. Then, in S1006, the management server 11 receives the authentication information sent from the second application 120, i.e., the information processing apparatus 100, and thereafter sends this authentication information to the authentication server 12 to issue an authentication instruction to the authentication server 12. Then, in S1007, the authentication server 12 receives the authentication information sent from the management server 11 and thereafter performs the authentication processing.

In the above description, the second application 120 checks in S1004 whether the installation of the first application 110 has been completed each time a predetermined period elapses. However, the present disclosure is not limited to this manner. For example, the second application 120 may check whether the first application 110 is in an installed state only once when the second application 120 is executed by the browser in S1002.

As described above, the information processing system 1 determines whether to cause the second application 120 to issue an authentication instruction according to a state of the first application 110. In other words, the information processing system 1 can control the timing to issue an authentication instruction according to a state of the first application 110. Thus, with the information processing system 1, even if the number of users of the first application 110, which needs to use an authentication service, increases, it is possible to curb the number of users who actually use the authentication service. Accordingly, with the information processing system 1, it is possible to lower the ratio of the number of users of an authentication service to the number of users of an application which uses the authentication service (e.g., first application).

Embodiment 3

An information processing system 1 according to Embodiment 3 will be described with reference to FIG. 11. The configuration of the information processing system 1 according to Embodiment 3 is similar to the configuration described in Embodiment 1 with reference to FIG. 1, and description thereof will therefore be omitted. Controlling of the timing to issue an authentication instruction according to a state of the first application 110 according to Embodiment 3 will be described with reference to FIG. 11. FIG. 11 is a sequence chart illustrating an example of the processing sequence of the authentication processing and the authorization processing in the information processing system 1 according to Embodiment 3. Note that each symbol "S" in the description of FIG. 11 means a step. The sequence chart illustrated in FIG. 11 is an example based on a case where the first application 110 and the second application 120 operate as native applications that operate in the information processing apparatus 100. In other words, the first application 110 and the second application 120, for example, operate in a state of being installed in the OS operating in the information processing apparatus 100.

The first application 110 and the second application 120 may be plug-in programs added on to the browser operating in the information processing apparatus 100. In this case, the first application 110 and the second application 120 are installed as plug-in programs in the OS operating in the information processing apparatus 100. In this case, the first application 110 and the second application 120 operate by being executed by the browser. The following description will be given on the assumption that the first application 110 and the second application 120 are native applications that operate in the information processing apparatus 100. Moreover, the description will be given on the assumption that the second application 120 is an application capable of performing control for installing one or more applications including at least the first application 110 into the OS operating in the information processing apparatus 100.

In S1101, a user installs the second application 120 into the OS operating in the information processing apparatus 100. Then, in S1102, the user launches the second application 120. After being launched, the second application 120 obtains a state of the first application 110. Specifically, the second application 120, for example, obtains information on whether the first application 110 is in an installed state. If the first application 110 has not been installed, the second application 120 starts installing the first application 110 in S1103. Then, in S1104, the second application 120 determines whether the installation of the first application 110 has been completed. The second application 120 may determine whether the installation of the first application 110 has been completed, for example, each time a predetermined period elapses until the installation of the first application 110 is completed after the start of the installation.

If it is determined in S1104 that the installation of the first application 110 has been completed, processes of S1105 to S1108 are performed. In this case, firstly, the user inputs authentication information in S1105. Specifically, for example, after determining that the installation of the first application 110 has been completed, the second application 120 displays the authentication screen 600 exemplarily illustrated in FIG. 6 on the display device not illustrated in FIG. 1. The user sees the authentication screen 600, inputs an ID and a password as authentication information, and thereafter presses the button 603. In S1106 after S1105, the second application 120 sends the ID and password input by the user as authentication information to the management server 11 to issue an authentication instruction to the management server 11. Then, in S1107, the management server 11 receives the authentication information sent from the second application 120, i.e., the information processing apparatus 100, and thereafter sends this authentication information to the authentication server 12 to issue an authentication instruction to the authentication server 12. Then, in S1108, the authentication server 12 receives the authentication information sent from the management server 11 and thereafter performs the authentication processing.

In the above description, only one first application 110 is present. However, the present disclosure is not limited to this configuration. For example, a plurality of first applications 110 may be present. In this case, the second application 120 may, for example, obtain a state of each of one or more first applications 110 among the plurality of first applications. Moreover, the second application 120 may determine whether to issue an authentication instruction based on the state of the one or more first applications 110.

Also, a description has been given of a configuration in which the second application 120 obtains a state indicating whether the installation of the first application 110 has been completed as the state of the first application 110, and makes a determination based on this state. However, the state of the first application 110 to be used by the second application 120 to make the determination is not limited to the above state. For example, the second application 120 may obtain a state indicating whether the first application 110 has ever been launched, whether the first application 110 is in a launched state, or the like and determine whether to issue an authentication instruction based on this state.

As described above, the information processing system 1 determines whether to cause the second application 120 to issue an authentication instruction according to a state of the first application 110. In other words, the information processing system 1 can control the timing to issue an authentication instruction according to a state of the first application 110. Thus, with the information processing system 1, even if the number of users of the first application 110, which needs to use an authentication service, increases, it is possible to curb the number of users who actually use the authentication service. Accordingly, with the information processing system 1, it is possible to lower the ratio of the number of users of an authentication service to the number of users of an application which uses the authentication service (e.g., first application).

Embodiment 4

In Embodiments 1 to 3, descriptions have been given of a configuration in which the second application 120 issues an authentication instruction to the management server 11 and the management server 11 in turn issues an authentication instruction to the authentication server 12. However, the present disclosure is not limited to this configuration. For example, the second application 120 may issue an authentication instruction directly to the authentication server 12, not via the management server 11.

Also, in Embodiments 1 to 3, descriptions have been given of a configuration in which whether to issue an authentication instruction is determined according to whether the first application 110 is in an installed state or whether the first application 110 is in a launched state. However, the present disclosure is not limited to this configuration. It suffices that the second application 120 controls the timing to issue an authentication instruction according to a state of the first application 110. Specifically, the second application 120 may, for example, determine whether to issue an authentication instruction based on whether the first application 110 is of a predetermined release version (e.g., a specific release version or later). Alternatively, the second application 120 may, for example, determine whether to issue an authentication instruction based on the degree of progress of execution of the first application 110. Here, the degree of progress of execution of the first application 110 is, for example, whether the first application 110 has completed a predetermined process (e.g., transition to a specific screen) or the like.

Still alternatively, the second application 120 may obtain a state of the authentication server 12 in addition to the state of the first application 110 and determine whether to issue an authentication instruction based on the obtained states of the first application 110 and the authentication server 12. For example, the second application 120 communicates with the authentication server 12 and obtains the number of users for which the authentication server 12 is performing the authentication processing at this time (hereinafter referred to as "authentication number"). The second application 120 performs control such that, for example, it issues an authentication instruction if the authentication number is less than a predetermined threshold value, and issues no authentication instruction if the authentication number is more than or equal to the threshold value regardless of the state of the first application 110.

In Embodiments 1 to 3, communication via HTTP has been described as an example of the communication between the information processing apparatus 100 and the server. However, the present disclosure is not limited to this communication. The communication between the information processing apparatus 100 and the server may be communication via another communication protocol other than HTTP.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to lower the ratio of the number of users of an authentication service to the number of users of an application which uses the authentication service.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-126780, filed Aug. 2, 2021 which is hereby incorporated by reference wherein in its entirety.

What is claimed is:

1. An information processing apparatus that executes a first application and a second application, comprising:
one or more hardware processors; and
one or more memories storing one or more programs configured to be executed by the one or more hardware processors, the one or more programs including instructions for:
obtaining a state of the first application by executing the second application;
determining whether to perform authentication processing according to the state of the first application by executing the second application; and
issuing an instruction to perform the authentication processing by executing the first application or the second application in a case of determining that the authentication processing is to be performed,
wherein at least one of the first application or the second application is a web application that operates in the information processing apparatus,
in a case where the first application is the web application that operates in the information processing apparatus, a browser operating in an apparatus other than the information processing apparatus issues an instruction to execute the first application, and the information processing apparatus presents a result of executing the first application to the browser, and
in a case where the second application is the web application that operates in the information processing apparatus, the browser operating in the apparatus other than the information processing apparatus issues an instruction to execute the second application, and the information processing apparatus presents a result of executing the second application to the browser.

2. The information processing apparatus according to claim 1, wherein the state of the first application is whether the first application has been installed.

3. The information processing apparatus according to claim 1, wherein the state of the first application is whether the first application has been launched, or the state of the first application is whether the first application has ever been launched.

4. The information processing apparatus according to claim 1, wherein the state of the first application is whether a predetermined event has occurred as a result of executing the first application.

5. The information processing apparatus according to claim 1, wherein the state of the first application is a release version of the first application to be executed.

6. The information processing apparatus according to claim 1, wherein the state of the first application is a degree of progress of the first application to be executed.

7. The information processing apparatus according to claim 1, wherein
the first application includes a plurality of applications, and
the one or more programs further include instructions for:
obtaining a state of one or more applications among the plurality of applications; and
obtaining the obtained state of the one or more applications as the state of the first application.

8. The information processing apparatus according to claim 1, wherein the one or more programs further include instructions for:
obtaining a state of an authentication server that performs the authentication processing in addition to the state of the first application; and
determining whether to perform the authentication processing according to the state of the authentication server in addition to the state of the first application.

9. The information processing apparatus according to claim 1, wherein the one or more programs further include an instruction for issuing the instruction to perform the authentication processing to a management server that manages or controls resources providable to the information processing apparatus; and wherein
the management server having received the instruction to perform the authentication processing issues an instruction to perform the authentication processing to an authentication server that performs the authentication processing.

10. The information processing apparatus according to claim 1, wherein the one or more programs further include an instruction for issuing the instruction to perform the authentication processing to an authentication server that performs the authentication processing.

11. The information processing apparatus according to claim 1, wherein the one or more programs further include an instruction for issuing the instruction to perform the authentication processing by executing the second application.

12. The information processing apparatus according to claim 1, wherein the second application is a resident application installed in the information processing apparatus.

13. The information processing apparatus according to claim 1, wherein the second application resides and operates in the information processing apparatus in response to launching an operating system of the information processing apparatus.

14. The information processing apparatus according to claim 1, wherein the first application is installed into the information processing apparatus by the second application.

15. The information processing apparatus according to claim 1, wherein at least one of the first application or the second application is a web application to be executed by a browser application operating in the information processing apparatus.

16. An information processing method involving executing a first application and a second application, comprising the steps of:
obtaining a state of the first application by executing the second application;
determining whether to perform authentication processing according to the state of the first application by executing the second application; and
issuing an instruction to perform the authentication processing by executing the first application or the second application in a case of determining that the authentication processing is to be performed,
wherein at least one of the first application or the second application is a web application that operates in the information processing apparatus,
in a case where the first application is the web application that operates in the information processing apparatus, a browser operating in an apparatus other than the information processing apparatus issues an instruction to execute the first application, and the information processing apparatus presents a result of executing the first application to the browser, and
in a case where the second application is the web application that operates in the information processing apparatus, the browser operating in the apparatus other than the information processing apparatus issues an instruction to execute the second application, and the information processing apparatus presents a result of executing the second application to the browser.

17. A non-transitory computer readable storage medium storing a program for causing a computer to perform a control method of an information processing apparatus that executes a first application and a second application, the control method comprising the steps of:
obtaining a state of the first application by executing the second application;
determining whether to perform authentication processing according to the state of the first application by executing the second application; and
issuing an instruction to perform the authentication processing by executing the first application or the second application in a case of determining that the authentication processing is to be performed,
wherein at least one of the first application or the second application is a web application that operates in the information processing apparatus,
in a case where the first application is the web application that operates in the information processing apparatus, a browser operating in an apparatus other than the information processing apparatus issues an instruction to execute the first application, and the information processing apparatus presents a result of executing the first application to the browser, and
in a case where the second application is the web application that operates in the information processing apparatus, the browser operating in the apparatus other than the information processing apparatus issues an instruction to execute the second application, and the information processing apparatus presents a result of executing the second application to the browser.

\* \* \* \* \*